United States Patent
He

(10) Patent No.: US 7,212,593 B2
(45) Date of Patent: May 1, 2007

(54) METHOD OF AND APPARATUS FOR NOISE WHITENING FILTERING

(75) Inventor: Shousheng He, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 743 days.

(21) Appl. No.: 10/684,598

(22) Filed: Oct. 14, 2003

(65) Prior Publication Data

US 2005/0079826 A1   Apr. 14, 2005

(51) Int. Cl.
H03D 1/04 (2006.01)
(52) U.S. Cl. .................... 375/346; 375/350
(58) Field of Classification Search ........... 375/346, 375/350, 355, 148, 149, 150
See application file for complete search history.

(56) References Cited

U.S. PATENT DOCUMENTS

| 6,185,175 | B1 |   | 2/2001 | Zook |
| 6,226,321 | B1 | * | 5/2001 | Michels et al. ............ 375/227 |
| 6,249,179 | B1 |   | 6/2001 | Maalej et al. |
| 6,314,147 | B1 |   | 11/2001 | Liang et al. |
| 6,470,047 | B1 |   | 10/2002 | Kleinerman et al. |

FOREIGN PATENT DOCUMENTS

| EP | 1255387 | 11/2002 |
| WO | WO 01/39448 A1 | 5/2001 |
| WO | WO-01/61950 | 8/2001 |
| WO | WO 01/93439 A1 | 12/2001 |
| WO | WO 02/11378 A1 | 2/2002 |
| WO | WO 02/103972 A1 | 12/2002 |

OTHER PUBLICATIONS

MMSE Decision-Feedback Equalizers: Finite-Length Results; Naofal Al-Dhahir et al.; IEEE Transactions on Information Theory, vol. 41, No. 4, Jul. 1995; pp. 961-975.
U.S. Appl. No. 10/685,218.

* cited by examiner

Primary Examiner—Emmanuel Bayard

(57) ABSTRACT

A method of and apparatus for reducing interference in a received signal. A normalized noise correlate is determined using the received signal and a first channel estimate of the received signal. Conditional whitening-filter settings are determined using the normalized noise correlate. A whitening filter is applied to the received signal in accordance with the conditional whitening-filter settings. A synchronization adjustment of an updated received signal is performed. A second channel estimate, which may be of the same span as the first channel estimate, is determined using an updated synchronization position and the updated received signal.

23 Claims, 2 Drawing Sheets

METHOD OF AND APPARATUS FOR NOISE WHITENING FILTERING

RELATED APPLICATIONS

This patent application is related in subject matter to and incorporates by reference the entire disclosure of U.S. patent application Ser. No. 10/685,218, entitled Method of and Apparatus for Single Antenna Interference Rejection through Relaxation, and filed on the same date as this patent application.

BACKGROUND OF THE INVENTION

1. Technical Field of the Invention

The present invention relates in general to simplified whitening filtering in digital communications systems and, more particularly, to noise whitening filtering in communications systems operating according to Global System of Mobile communications (GSM).

2. History of Related Art

Receiver performance in wireless digital time-division multiple access (TDMA) communication systems such as, for example, those operating according to Global System for Mobile communications (GSM), Enhanced Data GSM Evolution (EGDE), and Digital Advanced Mobile Service (DAMPS), is often interference-limited. Interference might come from, for example, other users. Users operating on identical carrier frequencies in neighboring cells might create co-channel interference (CCI), while users operating on adjacent carrier frequencies might create adjacent-channel interference (ACI).

ACI is typically dominated by interference from first adjacent channels, since interference from secondary adjacent channels can be effectively suppressed by a receiver filter. CCI and ACI typically appear as colored noise. A receiver demodulator based on Maximum-Likelihood Sequence Estimation (MLSE) is optimal only in the presence of white noise. Therefore, if not compensated for, colored noise can significantly degrade performance of receiver equalizers based on MLSE.

There are two primary approaches to whitening colored noise: 1) implicit whitening; and 2) explicit whitening. The implicit-whitening approach incorporates a whitening function in a so-called pre-filter (i.e., a whitened matched filter) when an equalizer with decision feedback is employed. Decision feedback equalizer (DFE) and decision feedback sequence estimator (DFSE) are examples of decision feedback. The implicit-whitening approach requires a pre-filter having a length that is much longer than a span of a corresponding channel. An ideal pre-filter is anti-causal and unlimited in time and can only be approximated. In addition, setup and processing of the pre-filter is often computationally expensive because the pre-filter setup involves spectrum factorization of the propagation channel and inversing the maximum/phase factor of the channel.

FIG. 1 is a functional block diagram that illustrates an exemplary explicit-whitening process. In FIG. 1, ⇒indicates a dependency relationship. Variables shown in FIG. 1 are as follows:

| | |
|---|---|
| r | received signal |
| r' | updated received signal |
| t | training sequence |
| p | synchronization position |

-continued

| | |
|---|---|
| $h_{\{n\}}$ | n tap channel estimate |
| $h'_{\{n+m\}}$ | n + m tap updated channel estimate |
| $\rho$ | noise correlate |
| $w_{\{m+1\}}$ | whitening filter coefficients |
| s | symbol estimate |

An explicit-whitening process 100 begins with burst synchronization of the received signal r at a synchronization block 102. The received signal r is also input to a channel estimate block 104, a noise correlation block 106, and a whitening filter block 110. The synchronization block 102 outputs the synchronization position p to the channel estimate block 104. The n-tap channel estimate $h_{\{n\}}$ is calculated at the channel estimate block 104 and is output to the noise correlation block 106. Autocorrelation of noise samples is performed at the noise correlation block 106. The noise correlation block 106 outputs the noise correlate $\rho$ to a whitening-filter-setting block 108. Whitening-filter settings determined by the whitening-filter-setting block 108 are input to a whitening-filter block 110.

The whitening-filter-setting block 108 may be adapted to solve a Yule-Walker equation using the noise correlate $\rho$. The output of the whitening filter block 110 is an updated received signal r'. The channel for the received signal r is n taps in length, while the composite channel for the updated received signal r' is n+(m+1)−1=n+m taps in length. The updated received signal r' output by the whitening filter block 110 is a convolution of the received signal r and the whitening filter of the whitening-filter block 110.

A second channel estimate is made at a channel estimate block 112. The second channel estimate, which is usually made via a generalized least square (GLS) algorithm, exploits knowledge of the whitening filter block 110. The second channel estimation is performed in order to obtain more accurate information about the composite channel to be input to an equalizer 114. The equalizer 114 receives as inputs an n+m tap updated channel estimate $h'_{\{n+m\}}$ from the channel estimate block 112 and the updated received signal r' from the whitening-filter block 110. The equalizer 114 outputs the symbol estimate s.

The composite channel for the updated received signal r' has a greater number of taps compared to the number of taps of the channel for the received signal r. The complexity of an MLSE equalizer (e.g., the equalizer 114) is determined by a composite-channel span. For binary modulations such as, for example, Gaussian minimum shift keying (GMSK) in GSM, an MLSE equalizer using a Viterbi algorithm has $2^{n-1}$ states, where n is the channel span. In order to implement the process 100, a full MLSE equalizer must therefore have $2^{n+m-1}$ states.

Even when the whitening filter block 110 is as short as a second order FIR filter, the equalizer 114 must still be four times more complex, due to the extension of the channel span. In addition, solving the Yule-Walker equation directly, with or without order recursion, is not always optimal in channel conditions with strong adjacent channel interference because the noise autocorrelation, and particularly elements at greater lags, are not accurate due to noise estimation error in strong ACI interferences.

SUMMARY OF THE INVENTION

These and other drawbacks are overcome by embodiments of the present invention, which provides a method of and apparatus for simplified whitening filtering. In an embodiment of the present invention, a method of reducing interference in a received signal includes determining a normalized noise correlate using the received signal and a first channel estimate of the received signal. Conditional whitening-filter settings are determined using the normalized noise correlate. A whitening filter is applied to the received signal in accordance with the conditional whitening-filter settings. The step of applying yields an updated received signal. A synchronization adjustment of the updated received signal is performed. The step of performing the synchronization adjustment yields an updated synchronization position. A second channel estimate is determined using the updated synchronization position and the updated received signal.

In another embodiment of the present invention, an apparatus for reducing interference in a received signal includes means for determining a normalized noise correlate using the received signal and a first channel estimate of the received signal. The apparatus also includes means for determining additional whitening-filter settings using the normalized noise correlate. The apparatus also includes means for applying a whitening filter to the received signal in accordance with the conditional whitening-filter settings to yield an updated received signal. The apparatus also includes means for performing a synchronization adjustment of the updated received signal to yield an updated synchronization position. The apparatus also includes means for determining a second channel estimate using the updated synchronization position and the updated received signal.

In another embodiment of the invention, an article of manufacture for reducing interference by a received signal includes at least one computer readable medium and processor instructions contained on the at least one computer readable medium. The processor instructions are configured to be readable from the at least one computer readable medium by at least one processor and thereby cause the at least one processor to operate to determine a normalized noise correlate using the received signal and a first channel estimate of the received signal. The processor instructions also cause the at least one processor to operate to determine conditional whitening-filter settings using the normalized noise correlate and apply a whitening filter to the received signal in accordance with the conditional whitening-filter settings to yield an updated received signal. The processor instructions also cause the at least one processor to operate to perform a synchronization adjustment of the updated received signal to yield an updated synchronization position and determine a second channel estimate using the updated synchronization and the updated received signal.

BRIEF DESCRIPTION OF THE DRAWINGS

A more complete understanding of exemplary embodiments of the present invention can be achieved by reference to the following Detailed Description of Exemplary Embodiments of the Invention when taken in conjunction with the accompanying Drawings, wherein.

DETAILED DESCRIPTION OF EXEMPLARY EMBODIMENTS OF THE INVENTION

To aid in illustrating the principles of the present invention, the apparatus and method are presented in the context of a GSM mobile station. It is not intended that the scope of the invention be limited to the examples presented herein. One skilled in the art can apply the principles of the present invention to numerous other types of communication systems as well.

Figure 2:
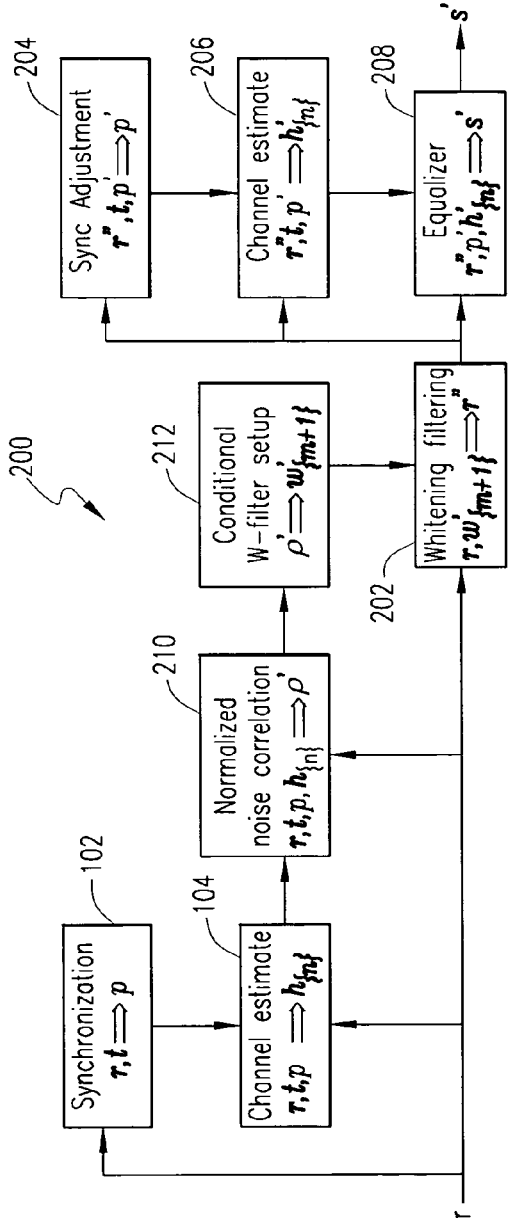
FIG. 2 is a functional block diagram that illustrates an exemplary explicit-whitening process in accordance with principles of the present invention.

FIG. 2 is a functional block diagram that illustrates an exemplary explicit-whitening process in accordance with principles of the present invention. IN FIG. 2, ⇒indicates a dependency relationship. Variables shown in FIG. 2 are as follows:

| | |
|---|---|
| r | received signal |
| r" | updated received signal |
| t | training sequence |
| p | synchronization position |
| p' | updated synchronization position |
| $h_{\{n\}}$ | n tap channel estimate |
| $h'_{\{n\}}$ | n tap updated channel estimate |
| ρ' | normalized noise correlate |
| $w'_{\{m+1\}}$ | whitening filter coefficients |
| s' | symbol estimate |

An explicit-whitening process 200 begins with burst synchronization of the received signal r at the synchronization block 102. The received signal r is also input to the channel estimate block 104, a normalized noise correlation block 210, and a whitening-filter block 202. The synchronization block 102 outputs the synchronization position p to the channel estimate block 104. The n-tap channel estimate $h_{\{n\}}$ is calculated at the channel estimate block 104 and is output to the normalized noise correlation block 210. Autocorrelation of noise samples is performed at the normalized noise correlation block 210. The noise correlation is normalized by scaling with the inverse of the total energy of the estimated channel taps. The normalized noise correlation block 210 outputs a normalized noise correlate ρ' to a conditional whitening-filter-setting block 212. The normalized noise correlate ρ' carries carrier-to-interference (C/I) ratio information. In a large region in which C/I is not very great, suppression of the noise correlate ρ' beyond a second lag thereof may be used to simplify computations performed by the conditional whitening-filter-setting block 212, in both order recursive and non-order recursive calculations, and to improve ACI channel performance. Suppression of lags in the noise autocorrelation leads to a shorter filter (i.e., fewer taps), which in turn gives simpler computations since, for higher order filters, matrix calculations are necessary.

The conditional whitening-filter-setting block 212 utilizes the normalized noise correlate ρ' output by the normalized noise correlation block 210. The zero lag, which is equivalent to estimated normalized noise power, may be used as a switch to determine whether higher-order lags should be used. If the noise samples are not correlated, the noise is already white, and no whitening is needed (i.e., only one tap $a_0$ in the whitening filter). A test is performed to determine if most of the autocorrelation stems from adjacent noise samples, in which case a first-order whitening filter is sufficient, and not from samples further away. The suppression can be switched on and off dependent upon the estimated normalized noise power. The pseudo-code below demonstrates exemplary order-recursive whitening-filter settings for a second-order whitening filter, which is a finite impulse response (FIR) filter with one real coefficient $a_0=1$ and two complex coefficients $a_1$ and $a_2$. $\eta$ represents a switch threshold and // indicates non-code comments.

```
WhiteningFilter2nd (ρ,η) {
    z = ρ₀² -|ρ₁|²;
    a₀ = 1;
    // assume ρᵢ|ᵢ>₁=0
    if (|ρ₁|² < ηρ₀²)// No whitening filter
        a₁ = a₂ = 0
    else if (|ρ₁|⁴ <ηz²)// 1st order whitening filter
        a₁ = -ρ₁/ρ₀;
        a₂ = 0;
    else // 2ⁿᵈ order whitening filter
        a₁ = -ρ₀ ρ₁/ z;
        a₂ = -ρ₁²/ z;
        if (ρ₀ <η)// adjustment at high C/I
            a₁ = a₁ + ρ₁*ρ₂/ z;
            a₂ = a₂ - ρ₀ρ₂/ z;
        end;
    end;
}
```

Figure 1:
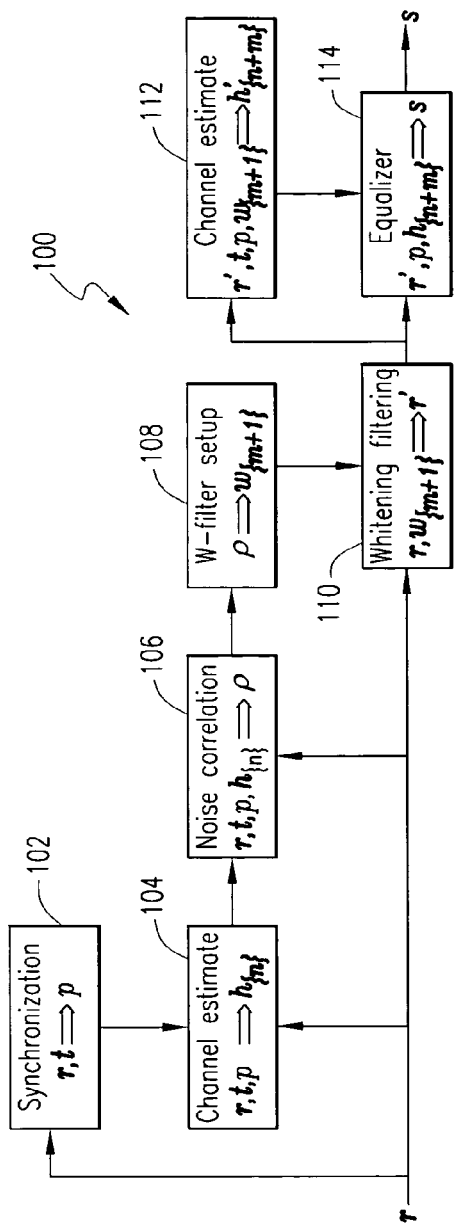
FIG. 1, previously described, is a functional block diagram that illustrates an exemplary explicit-whitening process.

Whitening-filter settings determined by the conditional whitening-filter-setting block 212 are input to a whitening-filter block 202. The output of the whitening filter block 202 is an updated received signal r". The received signal r is filtered by the whitening-filter block 202 in accordance with the whitening-filter settings to produce the updated received signal r". A synchronization-adjustment block 204 adjusts the synchronization position after the whitening filter block 202. Adjustment of the synchronization position by the synchronization-adjustment block 204 avoids the composite-channel span extension illustrated and described in connection with FIG. 1. The synchronization-adjustment block 204 serves to rectify error-prone synchronization in colored noise and enables a compact composite channel (i.e., $h'_{\{n\}}$) to cover most of the energy of the received signal r, the disposal of which can be altered after the whitening filter. The synchronization adjustment performed by the synchronization-adjustment block 204 can be viewed as a secondary synchronization with a narrower synchronization window than that of the synchronization block 102.

After synchronization adjustment by the synchronization-adjustment block 204, a second n-tap channel estimation is made at a channel estimate block 206. A more general case is one it which the second channel estimation is 1-tap, where $n \leq 1 < n+m$. Since it is not necessary to take the whitening filter into consideration, a more computationally-efficient least squares (LS) estimation by the channel estimate block 206 is typically sufficient. The second channel estimation is performed in order to obtain more accurate channel information to be input to an equalizer 208. The equalizer 208 receives as inputs an n tap updated channel estimate $h'_{\{n\}}$ from the channel estimate block 206 and the updated received signal r" from the whitening-filtering block 202. The equalizer outputs a symbol estimate s'.

The process 200 does not result in an extension in the number of taps of the composite channel for the updated received signal r". For binary modulations such as, for example, GMSK in GSM, an MLSE equalizer using a Viterbi algorithm has $2^{n-1}$ states, where n is the channel span. In order to implement the process 200, a full MLSE equalizer needs to have only $2^{n-1}$ states. Thus, a simpler equalizer with fewer states may be used.

Figure 3:
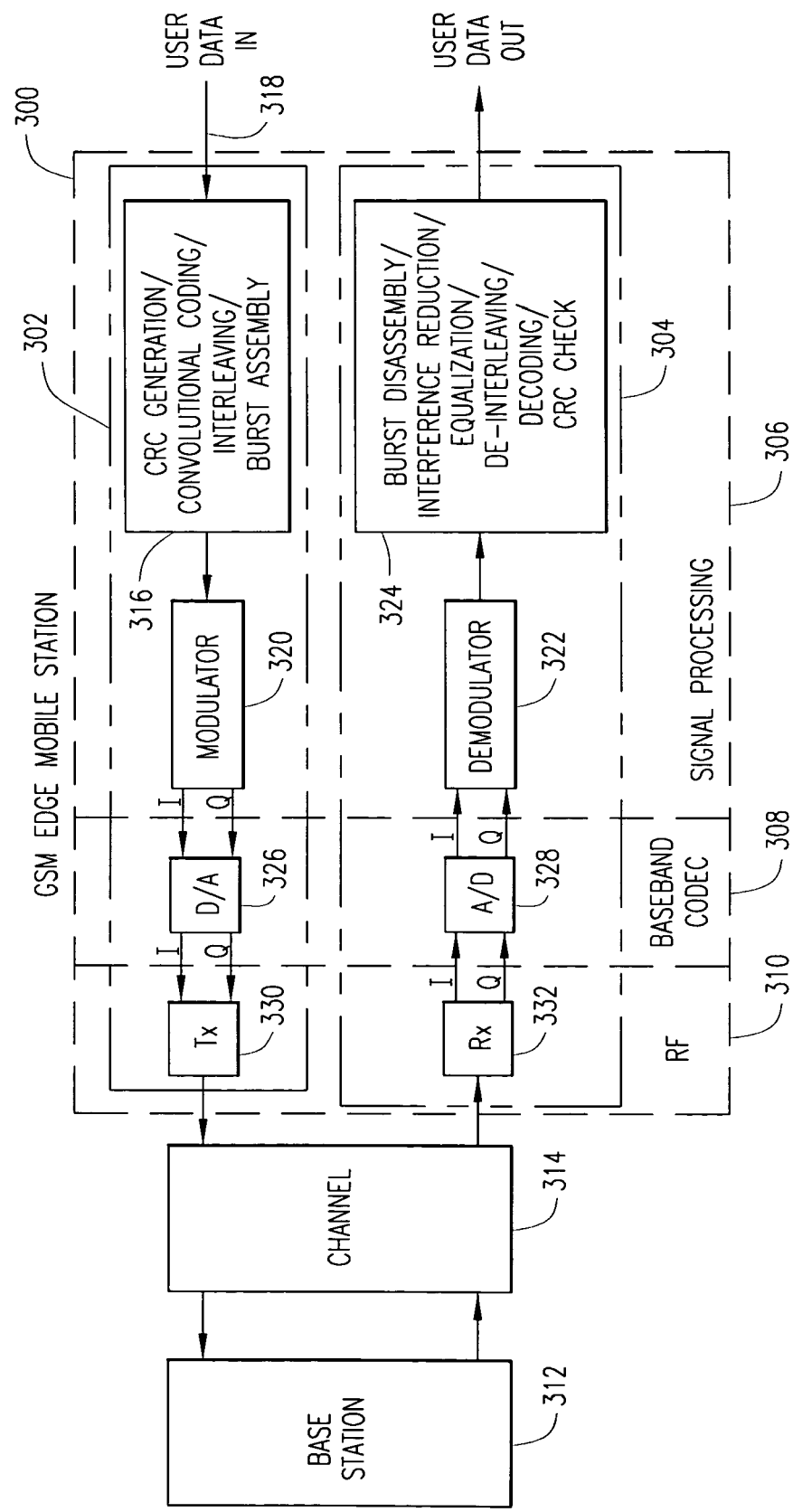
FIG. 3 is a diagram that illustrates an exemplary GSM EDGE-compatible mobile station in communication with a base station in accordance with principles of the present invention.

FIG. 3 is a block diagram that illustrates an exemplary GSM EDGE-compatible mobile station in communication with a base station in accordance with principles of the present invention. A mobile station 300 is intended to provide reliable data communications at rates of up to 384 kbit/s. The mobile station 300 includes a transmitter 302 and a receiver 304 divided into the following sections: signal processing circuitry 306, baseband codec 308, and RF circuitry section 310.

In a transmit direction, the signal processing circuitry 306 functions to protect data so as to provide reliable communications from the transmitter 302 to a base station 312 over a channel 314. Several processes performed by a channel coding block 316 are used to protect user data 318, including cyclic redundancy code (CRC) generation, convolutional coding, interleaving, and burst assembly. Resultant data is assembled into bursts, whereby guard and trail symbols are added in addition to a training sequence midamble that is added to the middle of the burst. Both the user data 318 and signaling information go through similar processing. The assembled bursts are modulated by a modulator 320.

In a receive direction, an output of the baseband codec 308 is demodulated using a demodulator 322. Several processes performed by a channel decoding block 324 in the signal processing circuitry 306 are applied to a demodulated output of the demodulator 322. The processes performed include burst disassembly, interference reduction in accordance with principles of the present invention, equalization, de-interleaving, convolutional decoding, and CRC check. The channel decoding block 324 is the entity that typically performs the process 200. However, interference rejection and equalization may also be represented as functions of the demodulator 322, in which case the process 200 would be represented as performed by the demodulator 322.

The baseband codec 308 converts transmit and receive data into analog and digital signals, respectively, via a digital-to-analog (D/A) converter 326 and an analog-to-digital (A/D) converter 328. The D/A converter 326 provides analog baseband I and Q signals to a transmitter 330 in the RF circuitry section 310.

In the receive direction, a signal transmitted by the base station 312 over the channel 314 is received by the receiver circuitry 332. Analog signals I and Q output from the receiver circuitry 332 are converted back into a digital data stream via the A/D converter 328. The I and Q digital data stream from the A/D converter 328 is filtered and demodulated by the demodulator 322 before being input to the channel decoding block 324. Several processes performed by the signal processing circuitry 306 are then applied to the demodulated output of the demodulator 322.

The mobile station 300 also performs other functions such as, for example, synchronization, frequency and time acquisition and tracking, monitoring, measurements of received signal strength. Other functions include handling a user interface, signaling between the mobile station 300 and a network, SIM interface, etc . . . Although embodiments of the invention have been described in the context of a mobile station, principles of the invention may also be applied to other entities, such as, for example, a base station.

Embodiments of the present invention may be implemented in, for example, integrated circuits or chip sets, wireless implementations, and receiver system products. For example, a computer is operative to execute software adapted to perform the demodulation techniques of the present invention. Software is adapted to reside on a computer readable medium, such as, for example, a magnetic disk within a disk drive unit. The computer readable medium may also include a flash memory card, EEROM based memory, bubble memory storage, ROM storage, etc. The software adapted to perform according to principles of the invention may also reside, in whole or in part, in the static or dynamic main memories or in firmware within a processor (i.e. within microcontroller, microprocessor or microcomputer internal memory). Principles of the invention may also be applied in implementations in integrated circuits, field programmable gate arrays (FPGAs), chip sets or application specific integrated circuits (ASICs), wireless implementations, and other communication system products.

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the invention defined by the following claims.

What is claimed is:

1. A method of reducing interference in a received signal, the method comprising:
    determining a normalized noise correlate using the received signal and a first channel estimate of the received signal;
    determining conditional whitening-filter settings using the normalized noise correlate;
    applying a whitening filter to the received signal in accordance with the conditional whitening-filter settings, the step of applying yielding an updated received signal;
    performing a synchronization adjustment of the updated received signal, the step of performing the synchronization adjustment yielding an updated synchronization position; and
    determining a second channel estimate using the updated synchronization position and the updated received signal.

2. The method of claim 1, further comprising:
    providing a result of a synchronization adjustment of the received signal; and
    determining a first channel estimate of the received signal using the result.

3. The method of claim 2, further comprising performing the synchronization adjustment of the received signal.

4. The method of claim 3, further comprising equalizing the updated received signal to yield a symbol estimate.

5. The method of claim 1, wherein:
    the step of determining the conditional whitening-filter settings comprises suppressing the normalized noise correlate beyond an nth lag responsive to a determination that a normalized noise power is greater than a threshold value; and
    n is a non-negative integer.

6. The method of claim 1, wherein the step of determining the conditional whitening-filter settings comprises:
    comparing a zero lag of the normalized noise correlate to a threshold value; and
    responsive to a result of the step of comparing, determining whether higher-order lags should be considered.

7. The method of claim 1, wherein the step of determining the conditional whitening-filter settings comprises:
    if the square of the absolute value of a first lag of the normalized noise correlate is less than a first threshold value, setting no whitening filtering; and
    if the absolute value of the first lag of the normalized noise correlate to the fourth power is less than a second threshold value, setting first-order whitening filtering.

8. The method of claim 7, wherein the step of determining the conditional whitening-filter settings comprises:
    if the square of the absolute value of the normalized noise correlate is not less than the first threshold and the absolute value of the normalized noise correlate to the fourth power is not less than the second threshold, setting second-order whitening filtering.

9. The method of claim 1, wherein the step of determining the second channel estimate using the updated synchronization position and the updated received signal comprises producing a second channel estimate of the same span as the first channel estimate.

10. An apparatus for reducing interference in a received signal, the apparatus comprising:
    means for determining a normalized noise correlate using the received signal and a first channel estimate of the received signal;
    means for determining conditional whitening-filter settings using the normalized noise correlate;
    means for applying a whitening filter to the received signal in accordance with the conditional whitening-filter settings to yield an updated received signal;
    means for performing a synchronization adjustment of the updated received signal to yield an updated synchronization position; and
    means for determining a second channel estimate using the updated synchronization position and the updated received signal.

11. The apparatus of claim 10, further comprising:
    means for providing a result of a synchronization adjustment of the received signal; and
    means for determining a first channel estimate of the received signal using the result.

12. The apparatus of claim 11, further comprising means for performing the synchronization adjustment of the received signal.

13. The apparatus of claim 12, further comprising means for equalizing the updated received signal to yield a symbol estimate.

14. The apparatus of claim 10, wherein:
    the means for determining the conditional whitening-filter settings comprises means for suppressing the normalized correlate beyond an nth lag responsive to a determination that normalized noise power is greater than a threshold value; and
    n is a non-negative integer.

15. The apparatus of claim 10, wherein the means for determining the conditional whitening-filter settings comprises:
    means for comparing a zero lag of the normalized noise correlate to a threshold value; and
    means for determining whether higher-order lags should be considered responsive to a result of the comparison.

16. The apparatus of claim 10, wherein the means for determining the conditional whitening-filter settings comprises:
    means for setting no whitening filtering if the square of the absolute value of a first lag of the normalized noise correlate is less than a first threshold value; and means for setting first-order whitening filtering if the absolute value of the first lag of the normalized noise correlate to the fourth power is less than a second threshold value.

17. The apparatus of claim 16, wherein the means for determining the conditional whitening-filter settings comprises:
means for setting second-order whitening filtering if the square of the absolute value of the normalized noise correlate is not less than the first threshold and the absolute value of the normalized noise correlate to the fourth power is not less than the second threshold.

18. The apparatus of claim 10, wherein the means for determining the second channel estimate using the updated synchronization position and the updated received signal comprises means for producing a second channel estimate of the same span as the first channel estimate.

19. The apparatus of claim 10, wherein the apparatus comprises a mobile station.

20. The apparatus of claim 10, wherein the apparatus comprises a base station.

21. The apparatus of claim 19, wherein the mobile station is compatible with GSM.

22. The apparatus of claim 20, wherein the base station is compatible with GSM.

23. An article of manufacture for reducing interference in a received signal, the article of manufacture comprising:
at least one computer readable medium having a memory storage;
processor instructions contained on the at least one computer readable medium, the processor instructions configured to be readable from the at least one computer readable medium by at least one processor and thereby cause the at least one processor to operate as to:
determine a normalized noise correlate using the received signal and a first channel estimate of the received signal;
determine conditional whitening-filter settings using the normalized noise correlate;
apply a whitening filter to the received signal in accordance with the conditional whitening-filter settings to yield an updated received signal;
perform a synchronization adjustment of the updated received signal to yield an updated synchronization position; and
determine a second channel estimate using the updated synchronization position and the updated received signal.

* * * * *